US007761293B2

(12) United States Patent
Tran

(10) Patent No.: US 7,761,293 B2
(45) Date of Patent: Jul. 20, 2010

(54) SPOKEN MOBILE ENGINE

(76) Inventor: Bao Q. Tran, 6768 Meadow Vista Ct., San Jose, CA (US) 95135

( * ) Notice: Subject to any disclaimer, the term of this patent is extended or adjusted under 35 U.S.C. 154(b) by 1083 days.

(21) Appl. No.: 11/369,104

(22) Filed: Mar. 6, 2006

(65) Prior Publication Data
US 2007/0207821 A1 Sep. 6, 2007

(51) Int. Cl.
G10L 15/00 (2006.01)
G06Q 30/00 (2006.01)
(52) U.S. Cl. .................... 704/231; 704/236; 705/14.12; 705/14.49
(58) Field of Classification Search ................. 704/270, 704/270.1, 275, 231, 236; 705/14, 27, 14.12, 705/14.49
See application file for complete search history.

(56) References Cited

U.S. PATENT DOCUMENTS

| 6,070,140 | A  | * | 5/2000  | Tran ............................ 704/275 |
| 6,108,631 | A  | * | 8/2000  | Ruhl ........................... 704/270 |
| 6,408,272 | B1 | * | 6/2002  | White et al. .............. 704/270.1 |
| 6,532,446 | B1 | * | 3/2003  | King ........................ 704/270.1 |
| 6,829,243 | B1 |   | 12/2004 | Sundhar |
| 6,970,871 | B1 | * | 11/2005 | Rayburn ...................... 707/10 |
| 6,980,984 | B1 |   | 12/2005 | Huffman et al. |
| 7,231,229 | B1 | * | 6/2007  | Hawkins et al. ............. 455/564 |
| 7,328,155 | B2 | * | 2/2008  | Endo et al. ................... 704/251 |
| 7,460,863 | B2 | * | 12/2008 | Steelberg et al. ............ 455/419 |
| 7,483,946 | B2 | * | 1/2009  | Boyd .......................... 709/204 |
| 2002/0032592 | A1 | * | 3/2002  | Krasnick et al. ................. 705/8 |
| 2002/0116196 | A1 | * | 8/2002  | Tran ............................ 704/270 |
| 2003/0125958 | A1 | * | 7/2003  | Alpdemir et al. ............ 704/275 |
| 2005/0143097 | A1 | * | 6/2005  | Wilson et al. ............. 455/456.3 |
| 2005/0228716 | A1 | * | 10/2005 | Endler et al. ................... 705/14 |
| 2005/0266831 | A1 |   | 12/2005 | Roth |
| 2005/0266863 | A1 |   | 12/2005 | Benco et al. |
| 2006/0074660 | A1 | * | 4/2006  | Waters et al. ................ 704/251 |
| 2006/0077968 | A1 |   | 4/2006  | Pitsoulakis et al. |
| 2006/0085261 | A1 | * | 4/2006  | Chu ............................ 705/14 |
| 2006/0155597 | A1 | * | 7/2006  | Gleason ........................ 705/14 |
| 2006/0170778 | A1 | * | 8/2006  | Ely et al. ................ 348/207.99 |
| 2007/0005363 | A1 | * | 1/2007  | Cucerzan et al. ............. 704/256 |
| 2007/0021166 | A1 | * | 1/2007  | Mattila .......................... 463/1 |
| 2007/0027889 | A1 | * | 2/2007  | Kaufman ..................... 707/101 |
| 2007/0167204 | A1 | * | 7/2007  | Lyle et al. ....................... 463/9 |
| 2007/0208564 | A1 | * | 9/2007  | Tran ............................ 704/254 |
| 2007/0287477 | A1 | * | 12/2007 | Tran ............................ 455/466 |

OTHER PUBLICATIONS

Logix Mobile Frequently Asked Questions Web Page dated Feb. 11, 2006.
UPSNAP Frequently Asked Questions Web Page dated Feb. 10, 2006.

* cited by examiner

Primary Examiner—Martin Lerner
(74) Attorney, Agent, or Firm—Tran & Associates

(57) ABSTRACT

Systems and methods are disclosed to operate a mobile device. The system includes a message center; an engine coupled to the message center; and a mobile device wirelessly coupled to the message center, wherein the engine specifies one or more meeting locations and wherein at least one meeting location comprises a location designated by an advertiser.

20 Claims, 6 Drawing Sheets

SPOKEN MOBILE ENGINE

This application is related to application Ser. No. 11/340,336 entitled "CELLULAR DEVICE WITH BROADCAST RADIO OR TV RECEIVER," application Ser. No. 11/323,789 entitled "WIRELESS MOBILE VIDEO", and application Ser. No. 11/369,028 entitled "MULTIMEDIA TELEPHONE", the contents of which are incorporated by reference.

BACKGROUND

Short Message Service (SMS) is a mechanism of delivery of short messages over the mobile networks and provides the ability to send and receive text messages to and from mobile telephones. SMS was created as part of the GSM Phase 1 standard. Each short message is up to 160 characters in length for Latin character messages. The 160 characters can comprise of words, numbers, or punctuation symbols. Short messages can also be non-text based such as binary. The Short Message Service is a store and forward service and messages are not sent directly to the recipient but through a network SMS Center. This enables messages to be delivered to the recipient if their phone is not switched on or if they are out of coverage at the time the message was sent—so called asynchronous messaging just like email. Confirmation of message delivery is another feature and means the sender can receive a return message notifying them whether the short message has been delivered or not. In some circumstances multiple short messages can be concatenated (stringing several short messages together).

In addition to SMS, Smart Messaging (from Nokia), EMS (Enhanced Messaging System) and MMS (Multimedia Messaging Service) have emerged. MMS adds images, text, audio clips and ultimately, video clips to SMS (Short Message Service/text messaging). Nokia created a proprietary extension to SMS called 'Smart Messaging' that is available on more recent Nokia phones. Smart messaging is used for services like Over The Air (OTA) service configuration, phone updates, picture messaging, operator logos etc. Smart Messaging is rendered over conventional SMS and does not need the operator to upgrade their infrastructure. SMS eventually will evolve toward MMS, which is accepted as a standard by the 3GPP standard. MMS enables the sending of messages with rich media such as sounds, pictures and eventually, even video. MMS itself is emerging in two phases, depending on the underlying bearer technology—the first phase being based on GPRS (2.5G) as a bearer, rather than 3G. This means that initially MMS will be very similar to a short PowerPoint presentation on a mobile phone (i.e. a series of "slides" featuring color graphics and sound). Once 3G is deployed, sophisticated features like streaming video can be introduced. The road from SMS to MMS involves an optional evolutionary path called EMS (Enhanced Messaging System). EMS is also a standard accepted by the 3GPP.

SUMMARY

In one aspect, systems and methods are disclosed to operate a mobile device. The system includes a message center; an engine coupled to the message center; and a mobile device wirelessly coupled to the message center, wherein the engine specifies one or more meeting locations and wherein at least one meeting location comprises a location designated by an advertiser.

In another aspect, systems and methods are disclosed to operate a mobile device by capturing user speech; converting the user speech into one or more speech symbols; transmitting the speech symbols over a wireless messaging channel to an engine (such as a search engine or a game engine, among others); and generating a result based on the speech symbols.

In yet another aspect, a system operates a mobile device with a message center; an engine (such as a search engine or a game engine, for example) coupled to the message center; and a mobile device wirelessly coupled to the message center, the mobile device capturing user speech, converting the user speech into one or more speech symbols; transmitting the speech symbols over a wireless messaging channel to the engine; and receiving a search result from the engine based on the speech symbols.

Implementations of the above aspects may include one or more of the following. The disambiguating symbol can be a location. The system can improve recognition accuracy based on the location information. The system can refine the result based on user history. The system can analyze usage pattern from a population of users to refine the result. The result can be ranked based on payment by an entity that is the target of the search. The system can search for one of: services, people, products and companies. The system can enhance a search for one of: services, people, products and companies by tailoring the search with one of: telephone area code, zip code, airport code. The system can also enhance a search for one of: services, people, products and companies by tailoring the search with automated position determination. The automated position determination can include triangulation based location determination, WiFi location determination, GPS, assisted GPS, GLONASS, assisted GLONASS, GALILEO, or assisted GALILEO.

Advantages of the system may include one or more of the following. The above system allows the user to use his/her voice instead of a limited keypad for inputting a full set of typographical characters as such keypad entry that can be very cumbersome and time consuming, e.g., with multiple keystrokes having to be entered to type a single character. The system is easy to use when the query is long. For searching, the search result provided by such verbal query is customized to the user's disambiguating data such as location data to provide useful on-the-go information to the user. Upon request, the system can also forward the user's request to the companies found in the search for call-back, thus increasing the call-through rate for advertisement purposes. For gaming, the game result can be customized according to the user's verbal instruction and the position information. The system can drive gamers in hunt of virtual treasures or virtual objectives to play the games at a predetermined location such as a concert event, a sports event, or a particular establishment such as Starbucks, McDonalds, Walmart, Sears, K-Mart, or any other businesses that are interested in driving potential customers to their physical location.

DESCRIPTION

Figure 1:
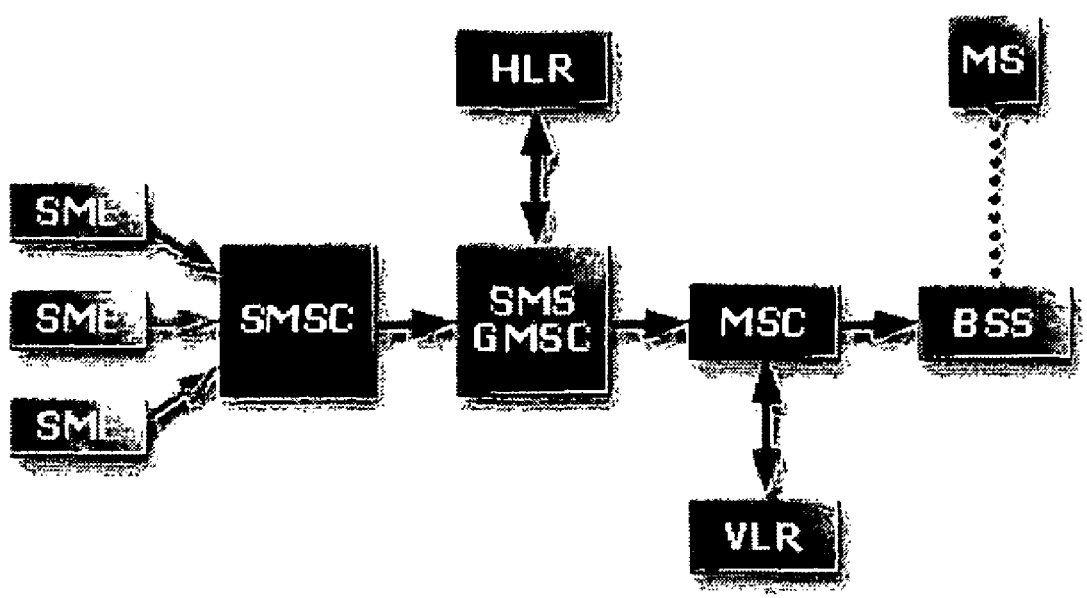
FIG. 1 shows a typical organization of network elements in a GSM network.

FIG. 1 shows a typical organization of network elements in a GSM network supporting messaging such as SMS. It is a store and forward way of transmitting messages to and from mobiles. The message (text only) from the sending mobile is stored in a central short message center (SMSC) which then forwards it to the destination mobile. The SMSC stores/forwards messages to and from the mobile station. The SME (Short Message Entity), which is typically a mobile phone or a GSM modem, can be located in the fixed network or a mobile station, receives and sends short messages. The SMS GMSC (SMS gateway MSC) is a gateway MSC that can also receive short messages. The gateway MSC is a mobile network's point of contact with other networks. On receiving the short message from the short message center, GMSC uses the SS7 network to interrogate the current position of the mobile station from the HLR, the home location register. HLR is the main database in a mobile network. It holds information of the subscription profile of the mobile and also about the routing information for the subscriber, i.e. the area (covered by a MSC) where the mobile is currently situated. The GMSC is thus able to pass on the message to the correct MSC. The MSC (Mobile Switching Center) is the entity in a GSM network which does the job of switching connections between mobile stations or between mobile stations and the fixed network. A VLR (Visitor Location Register) corresponds to each MSC and contains temporary information about the mobile, information like mobile identification and the cell (or a group of cells) where the mobile is currently situated. Using information from the VLR the MSC is able to switch the information (short message) to the corresponding BSS (Base Station System, BSC+BTSs), which transmits the short message to the mobile. The BSS consists of transceivers, which send and receive information over the air interface, to and from the mobile station. This information is passed over the signaling channels so the mobile can receive messages even if a voice or data call is going on.

Figure 2A:
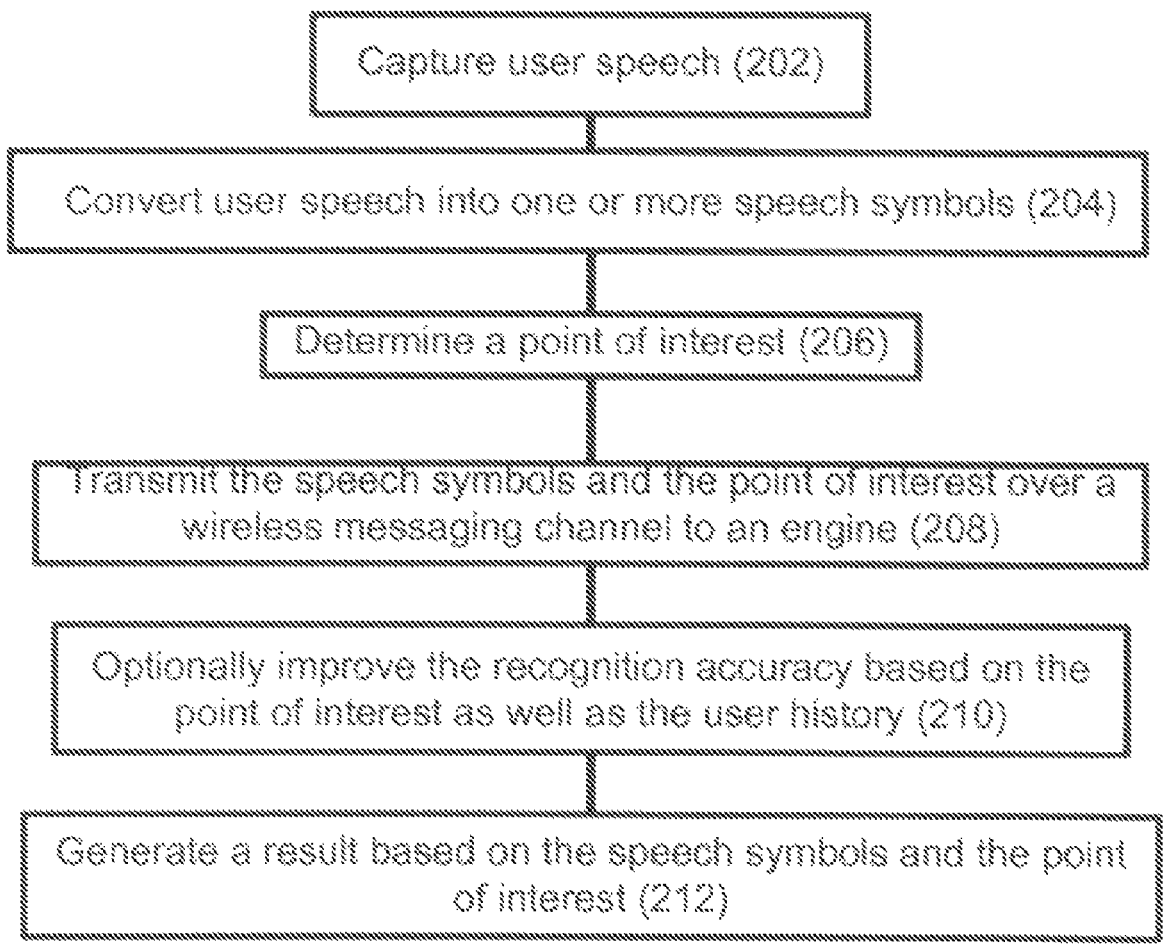
FIG. 2A shows an exemplary process for communicating speech to a remote server for determining user commands.

FIG. 2A shows an exemplary process for communicating speech to a remote server for determining user commands. The process captures user speech (202) and converts user speech into one or more speech symbols (204). The speech symbols can be phonemes, diphones, triphones, syllables, and demisyllables. The symbols can be LPC cepstral coefficients or MEL cepstrum coding technique can be used as symbols as well. More details on the conversion of user speech into symbols are disclosed in U.S. Pat. No. 6,070,140 entitled "Speech Recognizer" by the inventor of the instant application, the content of which is incorporated by reference.

Next, the process determines a point of interest such as an XY coordinate, a city name, a zip code, or an address (206). The process transmits the speech symbols and the point of interest over a wireless messaging channel to a search engine (208). The search engine can perform speech recognition and can optionally improve the recognition accuracy based on the point of interest as well as the user history (210). For example, if the user pronounces "Starbucks 95135" to try to locate a Starbucks coffee shop in the area with zip code 95135, the system based on prior user requests, would initiate a search query for Starbucks in the area with zip code 95135. The system generates a search result based on the speech symbols and the point of interest (212). The user can scroll the search results and identify the entity that he/she would like to contact. Alternatively, the user can press a button to indicate that the entity should call back the user.

In one embodiment, merchants pay the operator of the system for the privilege of calling the user back. Consumers simply elect to be called back by a merchant, by selecting the merchant. The server then bridges the mobile phone with the merchant automatically. The service is useful when traveling or when the user is unable to write down a number. Merchants pay to have their listings first. The user still gets listings for all merchants in the category he or she selects.

Figure 2B:
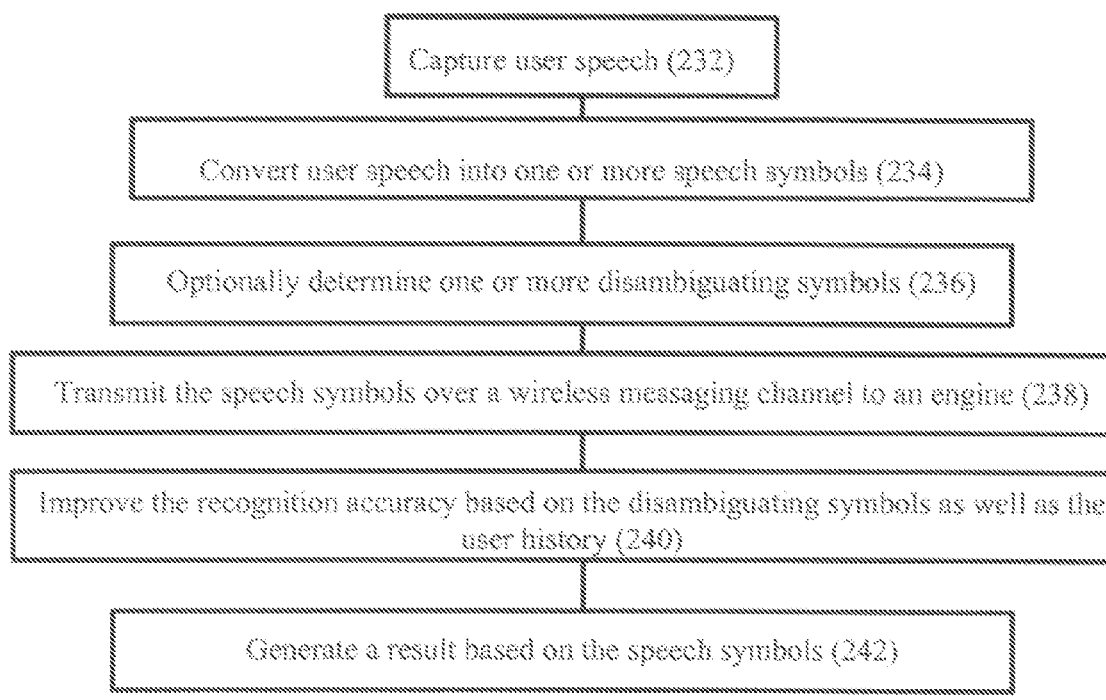
FIG. 2B shows another exemplary process for communicating speech to a remote server for determining user commands.

FIG. 2B shows another exemplary process for communicating speech to a remote server for determining user commands. Similar to the process of FIG. 2A, the process captures user speech (232) and converts the user speech into one or more speech symbols (234). Next, the process optionally determines one or more disambiguating symbols such as location symbols that help refine the subsequent speech recognition and game or search operation (236). The disambiguating symbols can be location related symbols such as XY coordinates, GPS coordinates, zip code, area code, city name, among others.

Next, the process transmits the speech symbols and the disambiguating symbols over a wireless messaging channel to a suitable engine such as a game engine or a search engine (238). The process improves the recognition accuracy based on the disambiguating symbols as well as the user history (240). Finally, the process generates a search result based on the speech symbols and the disambiguating symbols (242).

In addition to free text search, the system can also search predefined categories as well as undefined categories. For examples, the predefined categories can be sports, stocks, flight status, package tracking, price comparison, weather, yellow pages, movie show times, wifi hotspots, news, hotel reservations, drink recipes, jokes, horoscopes, or pickup lines, for example.

In yet other embodiments, the voice search system can provide mobile access to virtually any type of live and on-demand audio content, including Internet-based streaming audio, radio, television or other audio source. Wireless users can listen to their favorite music, catch up on the latest news, or follow their favorite sports.

The system can also automatically send information to the mobile device via text messages. An alert can be created for specific sports teams, leagues, weather reports, horoscopes, stock quotes and more. Alerts can be set on a regular delivery schedule or for event-triggers such as stock quote and sports score changes. Event-triggered alerts keep users informed about real-time changes to things that they care about. For example, sports alerts can provide instant updates at the end of a period, inning, quarter, half, game or golf round for MLB, NBA, NFL, NHL, PGA and all major college sports, instant updates when the score changes (excluding NBA) Stock Alerts, instant updates for user-specified stocks or funds at market open and/or close, or instant updates for designated percentage change in price or specified price targets, among others. "By giving users the choice to receive event-triggered alerts, users can stay current on the latest changes in their portfolio or with their favorite teams, they can make more informed decisions, save time, and stay in the know continuously about subjects and events that are important to them. Event-triggered alerts are an addition to periodic alerts that can be scheduled for delivery at the time and preference of the user. Periodic alerts include 5-day weather forecasts, daily horoscopes, plus sports and stock alerts that can be set to a time of day instead of an event.

In one implementation, an audio alert can be sent. First, an SMS notification (text) announcing the alert is sent to the subscriber's cell phone. A connection is made to the live or on-demand audio stream. The user listens to the announcement as a live or on-demand stream. The system provides mobile phone users with access to live and on-demand streaming audio in categories such as music, news, sports, entertainment, religion and international programming. Users may listen to their favorite music, catch-up on latest news, or follow their sports team. The system creates opportunities for content providers and service providers, such as wireless carriers, with a growing content network and an existing and flourishing user base. Text-based or online offerings may be enhanced by streaming live and on-demand audio content to wireless users.

Figure 3:
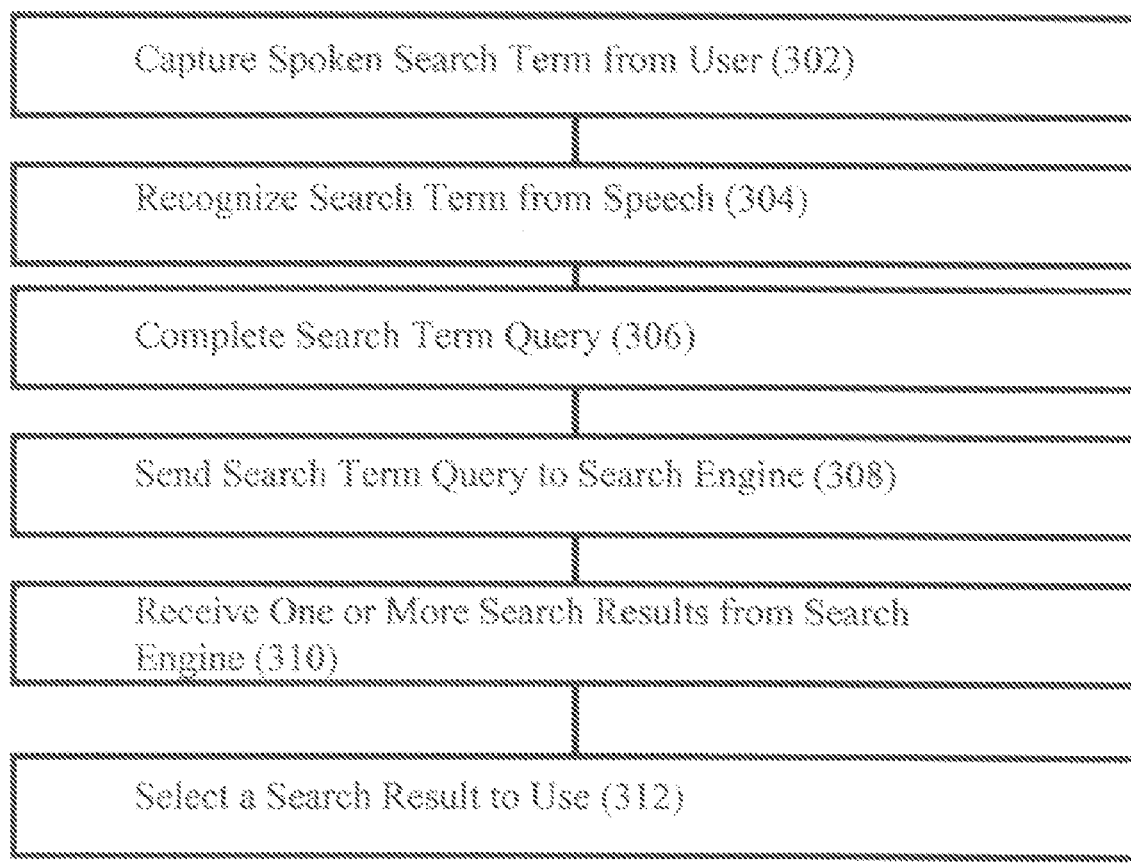
FIG. 3 shows another exemplary process in accordance with one embodiment of a mobile system such as a cell phone that can perform verbal searches.

FIG. 3 shows another exemplary process in accordance with one embodiment of a mobile system such as a cell phone that can perform verbal mobile phone searches. First, the mobile system captures spoken speech from a user relating to a desired search term (302). A speech recognition engine recognizes the search term from the user's spoken request (304). The system then completes a search term query (306) as needed. The system then sends the complete search term query to one or more search engines (308). The search engine can be a taxonomy search engine as described below. The system retrieves one or more search results from the search engine(s) (310), and presents the search result(s) to the user (312). The user can view or call the person or business associated with the desired search result.

In one implementation, if the user is interested in searching for a store called "Starbucks" in the current vicinity of the user, he/she would speak "Starbucks" to the mobile system computer, the system recognizes that the user is looking for Starbucks in his/her vicinity and would automatically determine its current position and append the position into the search term query. Hence, by speaking "Starbucks", the system would determine the location of the cell phone and create a query search for Starbucks in San Francisco, for example. In this manner the user can search for services, people, products and companies that are local to her or him with minimum effort.

In an implementation where the location information is manually entered, the system interprets the user request intelligently. For example the user can search for services, people, products and companies by telephone area code, by Zip Code, or by airport code. For example, to find a store called "Starbucks" in San Francisco, the user can speak to the cell phone:

Starbucks san francisco CA
Starbucks san fran (does partial match no state)
Starbucks 415 (by area code)
Starbucks 94118 (by Zip Code)
Starbucks SFO (by airport code)

In the event the system cannot understand the request, the system presents a template with the pre-formatted search string and the user can edit the template and submit the search request in the template format.

Figure 4A:
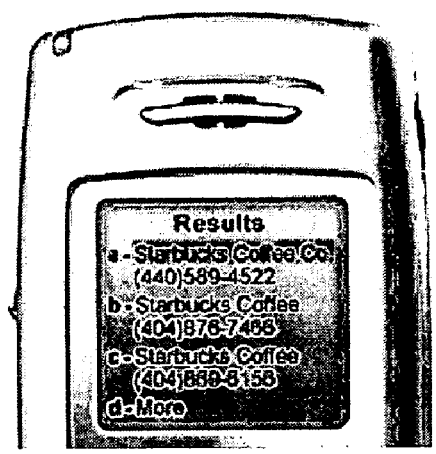
FIGS. 4A-4C show exemplary results of a voice based search.
Figure 4B:
Figure 4C:
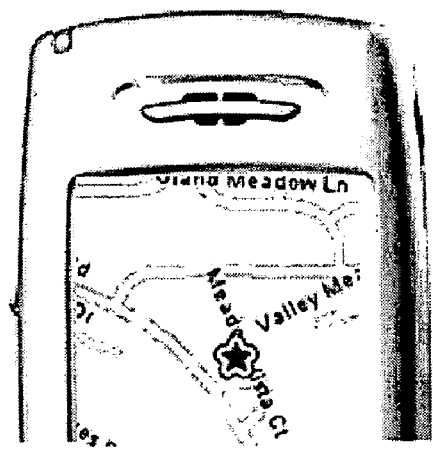

FIGS. 4A-4C show exemplary results of a voice based search. In this example, the user pronounces "Starbucks" and the system responds with search results in FIG. 4A. For more detail, the user can press a key or reply with one letter reply of his or her choice. FIG. 4B shows an example expansion when choice 'a' of FIG. 4A is selected. The exemplary result shown in FIG. 4B includes address and phone number. The result can also be map as shown in FIG. 4C or direction from the user's current position to the target address in other implementations. In other examples, the user can pronounce "Starbucks" along with a zip code, city or name such as "Starbucks 30342", "Starbucks Atlanta" or "Starbucks 404" and the result would be the same as those in FIGS. 4A-4B.

Figure 5:
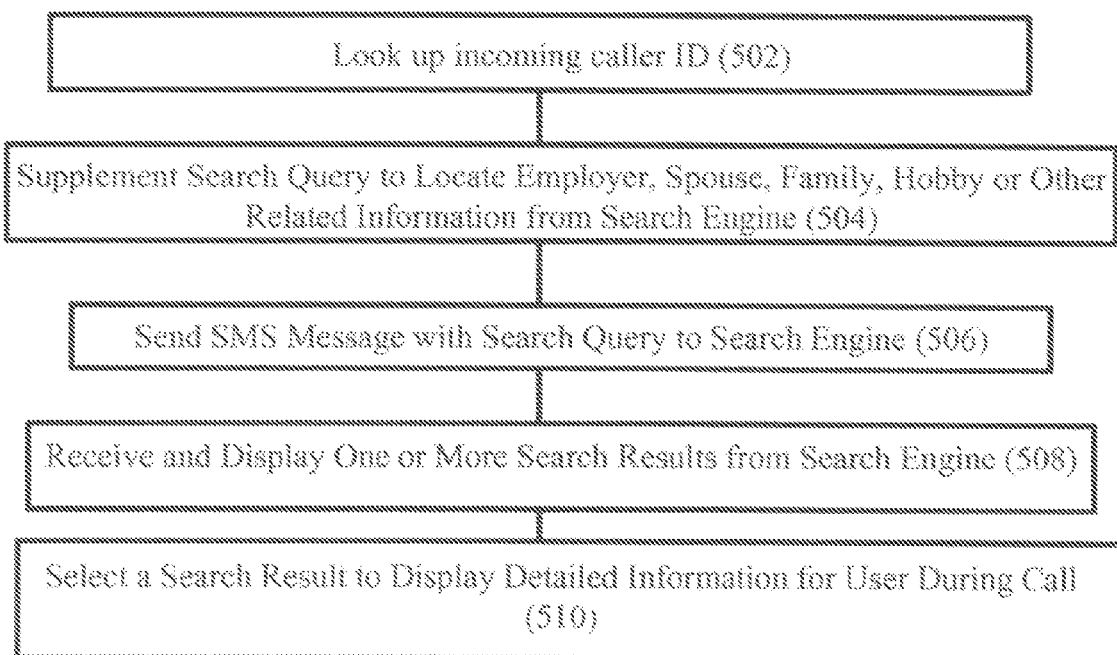
FIG. 5 shows an exemplary reverse look up system.

FIG. 5 shows an exemplary reverse look up system. When the user receives an incoming call, the system looks up incoming caller ID (502). This can be done using a telephone directory search in a database or in the cell phone's contact file. Alternatively, the system can search based on the name pronounced by the user's greeting speech. Next, the system supplements a Search Query to locate Employer, Spouse, Family, Hobby or Other Related Information from a Search Engine (504). The system sends an SMS Message with the Search Query to the Search Engine (506). The system then receives and displays one or more Search Results from the Search Engine (508). The system allows the user to scroll and select a Search Result to display more detailed information to the user during the call (510).

In addition to SMS or MMS, the system can work with XHTML, Extensible Hypertext Markup Language, also known as WAP 2.0, or it can work with WML, Wireless Markup Language, also known as WAP 1.2. XHTML and WML are formats used to create Web pages that can be displayed in a mobile Web browser. This means that Web pages can be scaled down to fit the phone screen.

In one embodiment, the search engine is a taxonomy search engine (TSE). TSE is a web service approach to federating taxonomic databases such as Google™ or specialized databases from retailers, for example. The system takes the voice based query (expressed in phonemes, for example), converts the speech symbols into query text and the query is sent to a number of different databases, asking each one whether they contain results for that query. Each database has its own way of returning information about a topic, but the details are hidden from the user. TSE converts the speech symbols into a search query and looks up the query using a number of independent taxonomic databases. One embodiment uses a wrapper-mediator architecture, where there is a wrapper for each external database. This wrapper converts the query into terms understood by the database and then translates the result into a standard format for a mediator which selects appropriate information to be used and formats the information for rendering on a mobile phone.

The growth of computer networks and increases in computer processing power has lead to the development of many databases or repositories of digitized or electronic images, graphics, music and videos. However, searching such multimedia files is still difficult. In one embodiment, a system locates a predetermined multimedia file by having users upload a plurality of image, music and video files to a server, each file including multimedia data such as image or video or audio data and meta data describing the content; extracting the multi-media data and meta-data from the multimedia files; updating a search engine index with the meta-data; and subsequently locating the predetermined multimedia file using the search engine.

In another embodiment, as part of the content upload, the user captures and edits video taken with a camcorder, camera or cell phones. The user performs simple edits to the video segment. The system allows the editing user more creative freedom at each step in the process, such as being able to preview and correct each edit decision on the fly. The video editing process becomes similar to putting together a document or graphics presentation where the user cuts and pastes the segments together adding effects and titles.

The software can provide Linear Editing where the content can only be edited sequentially similar to older mechanical techniques of cutting films to perform the edit functions. The software can alternatively provide Non-Linear Editing where editing in this environment is essentially a visual Cut-and-Paste method and the user can edit any part of the video at will.

The system can provide In-Camera Editing: Video shots are structured in such a way that they are shot in order and of correct length. In another embodiment, the system allows the user to assemble edit: Video shots are not structured in a specific order during shooting but are rearranged and unneeded shots deleted at the time of transferring (copying). This process requires at the least, a Camcorder and VCR. The original footage remains intact, but the rearranged footage is transferred to a new tape. Each scene or cut is "assembled" on a blank tape either one-at-a-time or in a sequence. The system can provide two types of Assemble Editing: 1) A Roll—Editing from a single source, with the option of adding an effect, such as titles or transitioning from a frozen image the start of the next cut or scene and 2) A/B Roll—Editing from a minimum of two sources or Camcorders and recording to a third source. The system can also support insert editing where new material is recorded over existing footage. This technique can be used during the original shooting process or during a later editing process. The system provides Titles on Cardboard, Paper, or other Opaque Media—Painting titles on opaque media and recording the pages on videotape and inserting or assembling the title between scenes, previously shot, during the editing process.

The system supports Sound Mixing where two or more sound sources can be connected to a sound mixer and then inputted into the video. The system also supports Audio Dubbing for adding audio to footage that is already edited together or previously shot. The audio is added to the video tape without altering the previously recorded video and, in some cases, without altering the previously recorded audio.

The above process is suitable for editing consumer produced content which tends to be short. In certain contents such as news or movies that take too long to transmit or view, the contents need to be reduced into chunks of one, five, ten or fifteen minutes, for example, to allow easy viewing while the user is traveling or otherwise don't have full attention on the device for an extended period. In one embodiment, video is micro-chunked to reduce entertainment to its simplest discrete form, be it a blog post, a music track, or a skit. Next, the system makes the content available and lets people download, view, read, or listen. The system lets consumers subscribe to content through RSS- and podcast-style feeds so they can enjoy it wherever and whenever they like. Optionally, the system can put ads and tracking systems into the digital content itself to provide revenue. In one implementation, the system provides microchunk videos entirely free, but it plays in a pop-up window alongside an ad or alternatively short commercials also play before some segments. The microchunks can be e-mailed, linked to, searched for, downloaded, remixed, and made available on-line.

The user or producer can embed meta data into the video or music. Exemplary meta data for video or musical content such as CDs includes artist information such as the name and a list of albums available by that artist. Another meta data is album information for the title, creator and Track List. Track metadata describes one audio track and each track can have a title, track number, creator, and track ID. Other exemplary meta data includes the duration of a track in milliseconds. The meta data can describe the type of a release with possible values of: TypeAlbum, TypeSingle, TypeEP, TypeCompilation, TypeSoundtrack, TypeSpokenword, TypeInterview, TypeAudiobook, TypeLive, TypeRemix, TypeOther. The meta data can contain release status information with possible values of: StatusOfficial, StatusPromotion, StatusBootleg. Other meta data can be included as well.

The meta-data can be entered by the musician, the producer, the record company, or by a music listener or purchaser of the music. In one implementation, a content buyer (such as a video buyer of video content) can store his or her purchased or otherwise authorized content on the server in the buyer's own private directory that no one else can access. When uploading the multimedia files to the server, the buyer annotates the name of the files and other relevant information into a database on the server. Only the buyer can subsequently download or retrieve files he or she uploaded and thus content piracy is minimized. The meta data associated with the content is stored on the server and is searchable and accessible to all members of the community, thus facilitating searching of multimedia files for everyone.

In one implementation that enables every content buyer to upload his/her content into a private secured directory that cannot be shared with anyone else, the system prevents unauthorized distribution of content. In one implementation for music sharing that allows one user to access music stored by another user, the system pays royalty on behalf of its users and supports the webcasting of music according to the Digital Millennium Copyright Act, 17 U.S.C. 114. The system obtains a statutory license for the non-interactive streaming of sound recordings from Sound Exchange, the organization designated by the U.S. Copyright Office to collect and distribute statutory royalties to sound recording copyright owners and featured and non featured artists. The system is also licensed for all U.S. musical composition performance royalties through its licenses with ASCAP, BMI and SESAC. The system also ensures that any broadcast using the client software adheres to the sound recording performance complement as specified in the DMCA. Similar licensing arrangements are made to enable sharing of images and/or videos/movies.

The system is capable of indexing and summarizing images, music clips and/or videos. The system also identifies music clips or videos in a multimedia data stream and prepares a summary of each music video that includes relevant image, music or video information. The user can search the music using the verbal search system discussed above. Also, for game playing, the system can play the music or the microchunks of video in accordance with a search engine or a game engine instruction to provide better gaming enjoyment.

In one gaming embodiment, one or more accelerometers may be used to detect a scene change during a video game running within the mobile device. For example, the accelerometers can be used in a tilt-display control application where the user tilts the mobile phone to provide an input to the game. In another gaming embodiment, mobile games determine the current position of the mobile device and allow players to establish geofences around a building, city block or city, to protect their virtual assets. The mobile network such as the WiFi network or the cellular network allows players across the globe to form crews to work with or against one another. In another embodiment, digital camera enables users to take pictures of themselves and friends, and then map each digital photograph's looks into a character model in the game. Other augmented reality game can be played with position information as well.

"Computer readable media" can be any available media that can be accessed by client/server devices. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices. Communication media typically embodies computer readable instructions, data structures, program modules or other data in a modulated data signal such as a carrier wave or other transport mechanism and includes any information delivery media.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system, comprising:
a cellular short message center;
a game engine coupled to the message center; and
a mobile device wirelessly coupled to the message center, wherein the game engine specifies one or more meeting locations, wherein the mobile device captures user speech, converts the user speech into one or more speech symbols; transmits the speech symbols over a wireless channel to the engine; improves voice recognition accuracy with one or more disambiguating symbols transmitted with the speech symbols including location related symbols, wherein the engine analyzes music clips or videos in a multimedia data stream and prepares a summary of each music clip or video including relevant image, music or video information and plays music or micro-chunks of video in accordance with a search engine or a game engine instruction to provide better gaming enjoyment.

2. The system of claim 1, wherein the engine receives location information of the mobile device.

3. The system of claim 1, wherein the engine considers a point of interest and user history for recognition.

4. The system of claim 1 comprising a digital camera to take one or more pictures, and wherein each picture is mapped into a character model in a game.

5. The system of claim 1, wherein the engine analyzes usage pattern from a population of users.

6. The system of claim 1, comprising one or more accelerometers to sense user movement.

7. The system of claim 1, wherein the engine comprises a search engine locating one of: service, people, products and company and wherein the engine further refines the search with one of: telephone area code, zip code, airport code, city, region.

8. The system of claim 1, comprising a reverse look-up of an incoming call, wherein the engine supplements a Search Query to locate Employer, Spouse, Family, Hobby from a Search Engine and sends an SMS Message with the Search Query to the Search Engine and displays one or more Search Results from the Search Engine.

9. The system of claim 1, wherein the mobile device comprises a positioning system and wherein the engine searches for one of: services, people, products and companies based on the positioning system.

10. The system of claim 9, wherein the automated position determination comprises triangulation based location determination.

11. The system of claim 1, comprising computer readable code to play micro-chunks of video to allow easy viewing while a user is traveling or do not have full attention on the mobile device for an extended period.

12. The system of claim 1, wherein the information includes contact information, map or direction.

13. The system of claim 1, wherein at least one meeting location comprises a location associated with an advertiser.

14. The system of claim 1, comprising computer readable code to take one or more pictures and map each picture into a character model in a game.

15. The system of claim 1, comprising computer readable code to edit a video on the mobile device.

16. The system of claim 15, wherein the mobile game sends players to a physical location.

17. The system of claim 15, wherein the mobile game sends directions to one of: a store, a retailer, a company, a venue.

18. The system of claim 1, wherein the engine receives a zip code of a location.

19. The system of claim 1, computer readable code to perform automated position determination with triangulation based location determination.

20. The system of claim 1, comprising computer readable code to search sports, stocks, flight status, package tracking, price comparison, weather, yellow pages, movie show times, wifi hotspots, news, hotel reservations, drink recipes, jokes, horoscopes, and pickup lines categories.

* * * * *